June 27, 1950 — J. L. REYNOLDS — 2,512,875
CELLULAR RADIANT HEATING PANEL
Filed June 20, 1949 — 2 Sheets-Sheet 1
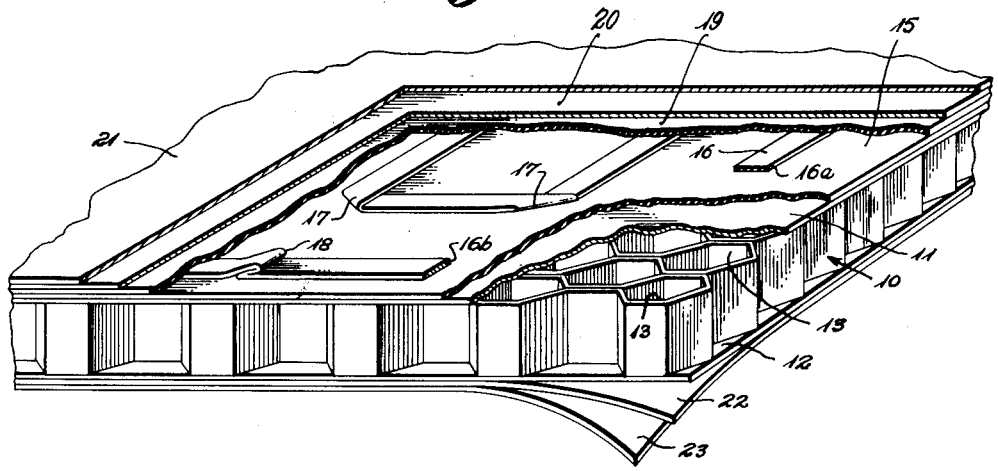
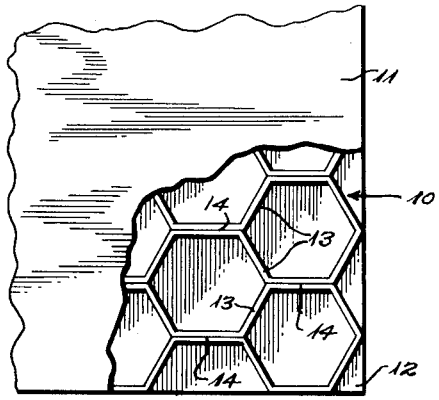 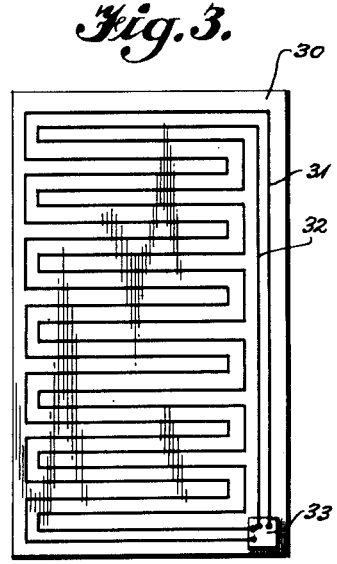
INVENTOR.
Julian L. Reynolds
BY
Bacon & Thomas
ATTORNEYS June 27, 1950 J. L. REYNOLDS 2,512,875
CELLULAR RADIANT HEATING PANEL
Filed June 20, 1949 2 Sheets-Sheet 2

INVENTOR.
Julian L. Reynolds
BY
Bacon & Thomas
ATTORNEYS

Patented June 27, 1950

2,512,875

UNITED STATES PATENT OFFICE 2,512,875

CELLULAR RADIANT HEATING PANEL

Julian L. Reynolds, Richmond, Va.

Application June 20, 1949, Serial No. 100,133

9 Claims. (Cl. 219—19)

This invention relates to radiant heating panels and particularly to a panel incorporating special insulating means peculiarly adapted to insulate the panel against the loss of radiant heat.

Thermal insulation is common and well known, particularly where employed to retain heat in an enclosure heated by the usual convection systems. In convection heating systems, and in those systems employing steam or hot water in the conventional type of iron radiator, the temperatures of the heating medium are customarily quite high. Such temperatures are usually well above 125° to 150° F. In heating systems employing convection heating of the types enumerated above, it is necessary to provide insulation designed particularly for the high temperature differentials involved. At those high temperatures the most effective insulations are those made of materials having low heat conductivity and arranged to break up the space occupied thereby into relatively small, separated cells or the like. The transmission of heat through a closed air cell in such high temperature environment takes place principally by conduction through the material bounding the cell and by virtue of convection currents within the cell itself. The quantity of heat lost through such insulation by radiation alone is relatively small in comparison. Thus it will be seen that for high temperature heating systems a particular type of insulation, as described, is most effective.

In radiant heating systems, however, the temperatures attained by the heating elements seldom exceed 120° F. and are usually well down in the range of temperatures from 75° F. to 120° F. When such conditions exist, the transmission of heat through a cold wall by conduction is relatively small because the temperature differential is considerably lower than that existing in the other types of heating systems referred to. Likewise, the heat lost through convection currents within small air cells is relatively low, due also to the fact that the temperature differential is quite low. The principal source of heat loss from a radiant panel is through radiation from the rear side of the panel and absorption by underlying conductive material or dispersion in space. Although the quantity of heat lost by radiation from a radiant panel is no greater than that lost by radiation from a convection heating system, yet the percentage of the total heat available represented by that loss is considerable in a radiant system. For the efficient operation of a radiant heating system, it is necessary to provide insulation particularly effective to prevent loss through the compartment walls by radiation itself.

The present invention relates to a radiant heating panel combined with an insulating system particularly well adapted to prevent loss by radiation. The invention comprises generally a heat producing panel or layer adjacent the radiating face of the panel and unobstructed air cells extending transversely through the panel to the rear face thereof. The rearmost ends of such air cells are closed by means providing a reflective surface to reflect heat radiated through said cells back to the heat producing layer. The invention further contemplates rear closures for said cells wherein the surface exposed to the cell may absorb radiant heat and become heated thereby but wherein the opposite surface of said closure means is of highly reflective material having a specular reflective surface. In such constructions the closure member does become warm but the heat contained therein is not permitted to radiate rearwardly since the reflective outer surface also has the characteristic of being a very poor emitter of radiant heat. Even though the rear closure becomes warm, the heat is trapped therein and the said rear closure becomes a radiating panel itself. A condition of equilibrium will be reached when said rear closure radiates heat forwardly through the air cells at substantially the same rate heat is being radiated rearwardly through said cells, thus the net loss is negligible or at least very low. In such an insulating system the greatest efficiency is attained when a free and unobstructed path is provided through the cells for the passage of radiant energy. The present invention also contemplates such cells having rear closures in which a specular reflecting surface faces the inside of the cell. With such an arrangement heat radiated rearwardly through the cell is not absorbed by the closure but is reflected back to the heat producing layer. Throughout this description and in the appended claims the term "reflective heat insulator," or its equivalent, is employed to include both the above arrangements, whether the specular surface is arranged to utilize its reflecting characteristics or its low emissivity.

The present invention incorporates efficient insulation for radiant heat along with high structural strength and, due to the structural features, the panel also becomes an effective acoustic insulator.

It is an object of this invention to provide a radiant heating panel of high thermal efficiency wherein a very large portion of the heat generated will be radiated from the front face of the panel as useful energy.

It is another object of this invention to provide a radiant heating panel very practical in conception and relatively inexpensive to produce.

It is another object of this invention to provide a radiant heating panel of a basic construction that may be utilized for many different types of installation.

It is a further object of this invention to provide a radiant heating panel combining an efficient and inexpensive heat producing unit and a particular insulator especially adapted to prevent loss of radiant heat.

Another object of this invention is to provide a radiant heating panel having high structural strength whereby it may function also as a structural portion of the enclosure being heated.

It is a still further object of this invention to provide a radiant heating panel serving also to effect acoustical insulation.

A still further object of this invention is to provide a rapid and economical method of manufacturing a heating panel.

A still further object of this invention is to provide novel and efficient heat producing units particularly adapted for use in the above-described panel.

Other objects and advantages will become apparent as the description proceeds in connection with the accompanying drawings, wherein:

Fig. 1 is a perspective view of a corner portion of a heating panel constructed in accordance with the present invention and wherein certain portions are broken away to uncover underlying portions.

Fig. 2 is a fragmentary plan view of a portion of a body member employed in the present invention with certain portions broken away to expose the underlying structure.

Fig. 3 is a schematic illustration of one manner of arranging resistance elements on the heating panel of the present invention.

Figure 4:
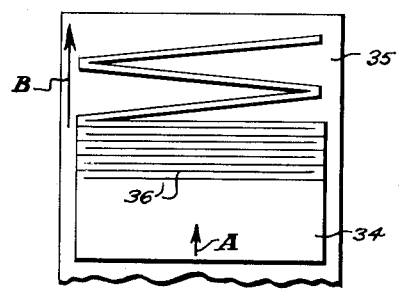
Fig. 4 is a schematic illustration of a method of producing a novel form of heating element.

Referring now particularly to Figs. 1 and 2, a body member for the panel comprises a core structure 10 and opposed surface layers 11 and 12. As clearly shown in Figs. 1 and 2, the core 10 comprises sinuously arranged strips 13 of thin sheet material arranged with their width extending transversely of the panel. At spaced areas, such as at 14, the strips 13 are provided with a suitable adhesive and adhered to the adjacent face of an adjacent strip 13. The spaced areas 14 on one face of each strip are in staggered relation to the adhesive areas on the other face of said strip whereby to provide a cellular structure similar in appearance to a "honeycomb." The strips 13 are all of substantially the same width and are arranged with corresponding edges lying in substantially coplanar relationship. The edge portions of the strips 13 comprising the core 10 are coated with a suitable adhesive and adhere to the sheets 11 and 12 to form the body member of the present invention. Such structures comprising the core 10 and sheets 11 and 12 are obtainable on the open market and do not, per se, constitute part of the present invention. Such structures are obtainable wherein the strips or ribbons 13 are of kraft paper and the sheets 11 and 12 are also of heavy paper considerably thicker than the strips 13. If desired, the strips 13 and/or the sheets 11 and 12 may be impregnated or coated with a stiffening material, such as a synthetic resin, to add rigidity and structural strength to the entire assembly. The structure described exhibits unusual strength and rigidity while being extremely light in weight.

The above description of the body member is merely illustrative and it is to be understood that such body members may be employed when constructed as described above or may be modified, as suggested hereinafter, for the construction of a radiant heating panel.

Referring now particularly to Fig. 1, a sheet 15 of suitable material, such as paper, is adhesively secured to the outer face of the sheet 11 of the body member and is provided on its outer face with a layer of suitable adhesive material on which a resistance element 16 is placed. In the particular embodiment shown in Fig. 1, the resistance element 16 comprises a continuous ribbon of aluminum foil sinuously arranged on the sheet 15 and provided with folds 17 to effect a change of direction at the desired points while maintaining a substantially flat structure. The resistance element 16 will preferably be arranged with its terminal ends lying closely adjacent each other, such as at 16a and 16b, whereby said terminal ends are simultaneously accessible for connection to a suitable electrical circuit. If desired, the terminal ends 16a and 16b may extend outwardly of the edge of the heating panel to provide free ends for such purpose. In assembling the resistance element to the supporting structure, the sheet 15 is preferably provided with a relatively thick coat of adhesive material and the resistance element 16 is positioned thereon while the adhesive material is still wet or tacky. When the element 16 is in position over the entire panel, an electric current is passed therethrough to heat the element. Such heating results in linear expansion of the element with resultant "buckling" at spaced points along its length. Such buckled portions are then pressed down into such folds as suggested at 18 and thereafter comprise suitable expansion joints for the element 16.

After the resistance element 16 has been positioned on the sheet 15 a second sheet 19 is adhesively adhered to the exposed face of the element 16 and the exposed portions of the sheet 15. It is understood that the sheets 15 and 19 will be of suitable electrical insulating material, such as paper or the like. Overlying the outer face of sheet 19 is a layer or sheet of heat distributing material 20. The sheet 20 may be of aluminum foil or any other suitable heat conducting material and is preferably adhesively secured to the sheet 19. Overlying the heat distributing sheet 20 is a layer of suitable decorative material 21, such as conventional wallpaper or the like. The sheet or layer 21 is provided with an outer surface of a configuration or color adapting it to ready radiation of heat. The layers 19 and 21 are sufficiently thin as to offer little resistance to the conduction of heat therethrough so that the sheet of metal 20 will be readily heated to a uniform temperature throughout its area and will, in turn, heat the layer 21 which constitutes the radiating face of the panel.

The rearmost face of the body member is provided with suitable insulating means to prevent loss of radiant heat therethrough. Such means comprises a sheet 22 of thin paper or the like and a sheet 23 of highly reflective material, such as aluminum foil. The sheet 23, especially if made of aluminum foil, is so thin and fragile that it is preferably adhesively laminated to a thin sheet 22 of paper or the like to facilitate handling. The thus laminated structure may be readily adhesively applied to the sheet 12 of the body member.

Although a specific arrangement of sheets and elements is illustrated in Fig. 1 and described in connection therewith, it will be readily apparent that many changes in the specific arrangement may be made without departing from the scope of the invention. For instance, the sheet 12 of the body member may be eliminated entirely and the laminated structure comprising sheets 22 and 23 may be adhered directly to the edges of the strips 13 either with the reflective surface 23 facing inwardly of the panel or outwardly at the rear surface thereof. Either arrangement will be effective as a radiant heat insulator, as described heretofore. Also, sheet 15, underlying the resistance element 16, may be omitted and the resistance element may be adhered directly to sheet 11 of the body member. Furthermore, if an arrangement is contemplated wherein the adjacent portions of the heating element 16 are relatively close together, the heat distributing layer of metal 20 will not be necessary and may be omitted entirely. Under such circumstances, the sheet 19 of insulating material may also be omitted, if desired, and the decorative layer 21 may be applied directly over the heating elements 16 and the then exposed portions of the sheet 11 of the body member. It will be obvious that many such permutations may be employed with equal facility and it is contemplated that the present invention encompass them all.

In practice, many different orders of procedure may be practiced in assembling the panel and mounting it in position. In all procedures the reflective insulator at the back of the panel will necessarily have to be applied before the panel is placed in position, but the remainder of the radiant heating assembly need not be attached to the body member before the panel is mounted. The body member with the reflective insulator may be first mounted on a wall or other supporting structure and the remaining layers applied thereafter. For instance, the sheet 15 (Fig. 1), the resistance element 16 and the sheet 19 could all be assembled in a "sandwich" structure at a factory or other suitable site and applied to the mounted body member very much as wallpaper is applied to a wall. If desired, the prefabricated heating unit may comprise only a sheet, such as 15, with the heating element 16 adhered thereto or the sandwich referred to may have a heat distributing plate, such as 20, also adhered thereto before application to the body member and the assembly may even have the decorative layer 21 fixed thereon. In the event the sheet 11 is omitted from the body member, as previously suggested, the same alternative procedures could be practiced. Also, the filament 16 could be attached to sheet 19 then the assembly applied directly to the sheet 11 of the body member.

Clearly the panel of the present invention could be incorporated in new structures and constitute the only wall surface provided. That is, the panels could be attached directly to the studding at the sides of the room without first plastering or otherwise providing a wall. The panels have sufficient strength and rigidity to function satisfactorily as a wall structure. Also, the radiant heating panel of the present invention could be applied to existing wall surfaces in any suitable manner. The panels may be bounded by a suitable frame attached to an existing wall or other surface.

When the panel is constructed with the reflective insulator at the outermost surface it will be preferable to mount such a panel spaced from its supporting structure so that the reflective surface of low emissivity will not be in heat conducting contact with the supporting structure over any substantial area. In installations where the panel must be supported with its rear surface contacting a wall or other surface throughout substantially its entire area, it will be preferable and more desirable to arrange the reflective insulating layer so that its specular surface faces the interior of the air cells in the body member. By this arrangement heat radiated rearwardly through the cells will be returned to the heat generating layer of the panel without being absorbed by the rear cell closures and thus dissipated to the support by direct conduction.

The order and sequence of applying the various layers described and/or suggested may clearly be modified to suit different circumstances and the structure of the panel disclosed readily lends itself to a wide variety of modified techniques.

Fig. 3 schematically illustrates a possible arrangement of electrical resistance elements comprising the heating unit of the present invention. Numeral 30 indicates a supporting sheet for resistance elements and numerals 31 and 32 indicate separate resistance wires, ribbons or the like, arranged in spaced parallel relation to each other and distributed in a grid-like formation over the surface of the supporting sheet 30. The terminal ends of each of the resistance elements will preferably extend to a junction box, plate or the like 33, arranged at some convenient location on the panel whereby the resistance elements 31 and 32 may be selectively arranged in the heating circuit individually and separately or jointly in either series or parallel arrangement to provide a selection of heating ranges. Such a selection of heating ranges is desirable where outdoor temperatures vary widely during a heating season. This arrangement of resistance elements may be employed in any of the specific structures described herein and such resistance elements may comprise ribbons of aluminum foil, as previously suggested, or any other suitable resistance medium, such as Nichrome or iron wire.

Fig. 4 illustrates a modified form of heating unit and suggests a method for its manufacture. Numeral 34 represents a sheet of foil of aluminum or other suitable resistance material being moved upwardly rather slowly as indicated by the arrow A. Numeral 35 represents a sheet of electrical insulating material such as paper or the like being moved upwardly at a greater rate than the sheet 34, as indicated by the arrow at B. During its forward or upward movement, the sheet of foil 34 is provided with laterally extending slits 36 extending alternately from opposite side edges of the sheet 34 to points spaced from the opposite side edge. After the slits 36 are produced in sheet 34 the leading portion of the slit sheet 34 is pressed into engagement with the supporting web 35, to which a layer of adhesive has been previously applied. Since the sheet 35 is advancing at a greater rate than the sheet 34, it is apparent that the slit portions of the sheet 34 will be "expanded" to the configuration shown in the upper portion of the figure and as the ribbon is drawn to such expanded condition it is continually pressed into firm engagement with the adhesive surface of 35 to form a resistance grid unit that may be incorporated in any of the suggested assemblies for the radiant heating panel previously described. If desired, an additional sheet of paper or the like may be superimposed over the zig-zag grid thus produced and the resulting "sandwich" employed in assembling radiant heating panels.

Figure 5:
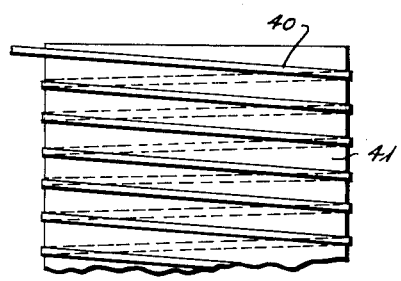
Fig. 5 is a fragmentary elevational view of a portion of a heating element comprising a further embodiment thereof.

Fig. 5 illustrates a still further modification of heating unit wherein a thin ribbon of suitable resistance material 40 is wound, in the form of a flat helix about a supporting sheet 41 of suitable insulating material. The sheet 41 may be a thin plastic web, kraft paper, or the like and will preferably be provided with an adhesive coating to hold the resistance element 40 in position thereon. This element may also be fabricated with or without cover sheets.

Each of the heating units of Figs. 4 and 5 are adaptable to a wide variety of applications, since they may be mounted on panels of either flat or curved surface configuration.

Figure 6:
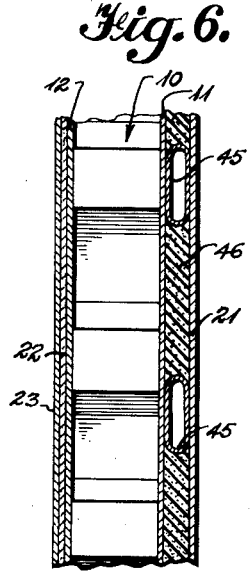
Figs. 6, 7 and 8 are fragmentary sectional views through different modifications of radiant heating panels constructed in accordance with the present invention.

Referring now to Fig. 6, a modified panel assembly is shown wherein a body member comprising a core 10 and cover sheets 11 and 12, as described in connection with Fig. 1, forms the supporting structure. This figure also shows the reflective insulating means 23 supported on a web 22, also as described in connection with Fig. 1, but it is to be understood that all of the modifications of the reflective insulating layer previously suggested may be employed with equal facility here. According to the embodiment of Fig. 6 a grid of fluid conducting tubes 45 is arranged on a forward face of the body member and are so connected as to define paths for the distribution of a fluid heating medium over the surface of a panel structure. The tubes or conduits 45 will preferably be constructed of metal having relatively high heat conductivity, such as copper or aluminum. Since the fluid conduits of this modification are of substantial thickness, it is necessary to provide additional means to define a smooth outer surface for the reception of the decorative sheet 21. In the spaces between adjacent portions of the conduit 45, a suitable mastic or filler 46 is provided to fill the said spaces and provide a smooth, continuous surface to which the sheet 21 may be glued. The material 46 may be any suitable material and may constitute the entire outer surfacing of the panel, thus eliminating the decorative sheet 21. If desired, the filler material 46 may be a mastic having a filler of powdered metal particles which would act to absorb and distribute heat from the conduits 45 throughout the radiating area of the panel. This applicant's copending application, Serial Number 38,333, filed July 12, 1948, discloses several modifications of such fluid conducting structures for use in radiant heating panels and it is contemplated that any of the modifications shown therein may be employed in combination with the cellular and reflective insulation, all within the scope of the present invention.

Figure 7:
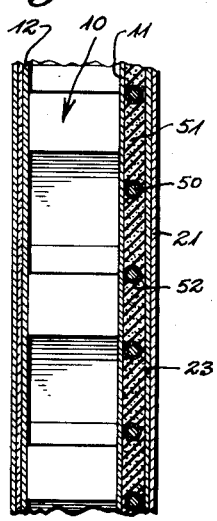

The embodiment shown in Fig. 7 may have the same basic structure, as to body member and rear-face insulation as suggested in connection with Figs. 1 and 6. The heating unit of this modification, however, comprises resistance wires 50 of substantial thickness, thus necessitating the use of a filler material 51 which may be the same as the filler material described in connection with Fig. 6. If the filler employed is of a metallic nature, to act as a heat spreader, electrical insulation 52 about the wires 50 will be necessary. Here also a decorative layer 21 may be provided.

Figure 8:
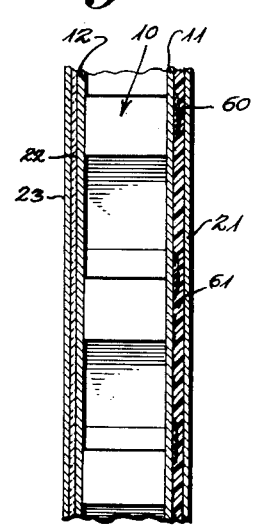

The modification of Fig. 8 has the same basic construction as the forms shown in Figs. 1, 6 and 7 and is subject to all the modifications thereof previously described. In this embodiment, however, a heating unit comprises a resistance element 60 consisting of a stripe of electrically conducting particles, preferably of metal, bonded together by any suitable means. Such stripes may be printed, painted, or otherwise applied to the face 11 of the body member or prefabricated by application to a thin, flexible web of suitable insulating material. A filler 61, which may be a plastic adhesive, provides a support for a decorative sheet 21 if the latter is employed.

The various modifications are adaptable to be constructed with or without a heat distributing layer over the heat supplying element, whether that element be of the electrical resistance or fluid conduit type. Such heat distributing layer may be a sheet of metal as specifically shown in Fig. 1, a metal-containing filler material as shown in Figs. 6 and 7, or may be a layer of sprayed powdered material which may be applied to any of the modifications suggested.

The reflective insulating layer at the rear of the panel has been described as being adhered to a sheet of paper or the like 22 but clearly the metal foil may be used in association with a fire-resistant web, such as an asbestos sheet, asbestos paper, glass cloth or the like. These additionally suggested materials would be employed where it is desired to increase the fire resistance of the panel beyond that resistance provided by the reflective sheet 23. Furthermore, in any of the embodiments employing paper or other inflammable materials for any portion, impregnation with a flame inhibiting composition may be resorted to.

As previously suggested, the heating panel of the present invention provides not only an efficient radiant heater but has sufficient structural strength to act as a structural unit at the same time. The panel has further advantageous characteristics in that the cellular and reflective features combine to produce an efficient sound insulator. By the employment of such panels, housing units may be constructed inexpensively by employing such panels to perform the triple function of radiant heating, sound insulation and wall definition. Such panels as described herein may also be employed on other than flat surfaces, such as covering for columns or as heaters and insulators for buses, trucks, trains and the like. Due to the strength of the panels they may also be employed as flooring, by covering with a suitable floor covering, such as linoleum, asphalt tile, or the like, and will function satisfactorily as radiant heaters under such conditions.

Although a limited number of specific embodiments have been shown and described herein, it is to be understood that the invention is not limited thereto but encompasses all modifications falling fairly within the scope of the appended claims.

I claim:

1. A radiant heating panel comprising, a body member, heating means on one face of said body member defining a radiant heating surface, a reflective heat insulating layer at the other face of said body member, said body member having air cells therein extending substantially from said one face to said other face.

2. A radiant heating panel as defined in claim 1 wherein said cells are separated by thin walls extending from said one face to said other face, said walls being of a material having poor heat conductivity.

3. A radiant heating panel as defined in claim 1 wherein each of said cells defines an unobstructed path for radiant heat between said faces.

4. A radiant heating panel comprising, a body member having passageways extending through opposed surfaces thereof, radiant heating means lying against one of said surfaces and closing adjacent ends of said passageways, and heat insulating means closing the other ends of said passageways.

5. A radiant heating panel as defined in claim 4 wherein said passageways are substantially straight and extend substantially normal to said surfaces.

6. A radiant heating panel as defined in claim 4 wherein said passageways are defined by thin walls of heat insulating material extending transversely between said surfaces.

7. A radiant heating panel as defined in claim 4 wherein said heat insulating means is non-combustible.

8. A radiant heating panel comprising, a body member, a layer of fire resistant material on one face of said body member, an electrical resistance element on the outer face of said fire resistant layer, a covering layer for said resistance element, a reflective heat insulating layer at the opposite face of said body member, said body member having air cells therein extending substantially from said one face to said opposite face.

9. A radiant heating panel as defined in claim 1 wherein said heating means comprises a pair of resistance elements sinuously arranged in spaced parallel relation on the said one face of said body member, each of the terminal ends of said elements lying closely adjacent each other whereby said elements may be readily and selectively individually arranged in an electrical circuit in parallel or series arrangement.

JULIAN L. REYNOLDS.

REFERENCES CITED

The following references are of record in the file of this patent:

UNITED STATES PATENTS

| Number | Name | Date |
|---|---|---|
| 738,970 | Yates | Sept. 15, 1903 |
| 1,740,336 | Crittal et al. | Dec. 17, 1929 |
| 1,767,716 | Stoekle | June 24, 1930 |
| 2,061,107 | Schellenger | Nov. 17, 1936 |
| 2,087,573 | Hamilton | July 20, 1937 |
| 2,438,205 | Coates | Mar. 23, 1948 |

FOREIGN PATENTS

| Number | Country | Date |
|---|---|---|
| 224,321 | Great Britain | Nov. 13, 1924 |
| 224,648 | Great Britain | Nov. 20, 1924 |
| 218,846 | Switzerland | Apr. 16, 1942 |

OTHER REFERENCES

Ser. No. 317,610, Mossin (A. P. C.), published May 25, 1943.